United States Patent
Eubank et al.

(10) Patent No.: US 11,947,005 B2
(45) Date of Patent: *Apr. 2, 2024

(54) CORRECTING DEPTH ESTIMATIONS DERIVED FROM IMAGE DATA USING ACOUSTIC INFORMATION

(71) Applicant: Apple Inc., Cupertino, CA (US)

(72) Inventors: Christopher T. Eubank, San Francisco, CA (US); Ryan S. Carlin, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,859

(22) Filed: Nov. 1, 2022

(65) Prior Publication Data
US 2023/0047317 A1 Feb. 16, 2023

Related U.S. Application Data

(63) Continuation of application No. 16/580,337, filed on Sep. 24, 2019, now Pat. No. 11,520,041.
(Continued)

(51) Int. Cl.
G06K 9/00 (2022.01)
G01S 15/89 (2006.01)
G06T 7/50 (2017.01)

(52) U.S. Cl.
CPC ............... *G01S 15/89* (2013.01); *G06T 7/50* (2017.01); *G06T 2207/10028* (2013.01)

(58) Field of Classification Search
CPC .. G01S 15/89; G06T 7/50; G06T 2207/10028
See application file for complete search history.

(56) References Cited

U.S. PATENT DOCUMENTS

| | | | | |
|---|---|---|---|---|
| 5,933,240 A | * | 8/1999 | Jurca | G01B 11/026 356/3.11 |
| 7,538,326 B2 | * | 5/2009 | Johnson | H04N 23/45 250/370.08 |

(Continued)

FOREIGN PATENT DOCUMENTS

| | | | | |
|---|---|---|---|---|
| CN | 105705210 A | * | 6/2016 | ............ A63F 13/211 |
| JP | 200748306 A | * | 2/2007 | |

(Continued)

OTHER PUBLICATIONS

3D Reconstruction in the Presence of Glass and Mirrors by Acoustic and Visual Fusion, Yu Zhang et al., IEEE, Aug. 2018, pp. 1785-1796 (Year: 2018).*

(Continued)

*Primary Examiner* — Jayesh A Patel
(74) *Attorney, Agent, or Firm* — Fernando & Partners, LLP

(57) ABSTRACT

In one implementation, a method includes: obtaining a first depth estimation characterizing a distance between the device and a surface in a real-world environment, wherein the first depth estimation is derived from image data including a representation of the surface; receiving, using the audio transceiver, an acoustic reflection of an acoustic wave, wherein the acoustic wave is transmitted in a known direction relative to the device; and determining a second depth estimation based on the acoustic reflection, wherein the second depth estimation characterizes the distance between the device and the surface in the real-world environment; and determining a confirmed depth estimation characterizing the distance between the device and the surface based on resolving any mismatch between the first depth estimation and the second depth estimation.

25 Claims, 10 Drawing Sheets

Related U.S. Application Data

(60) Provisional application No. 62/737,614, filed on Sep. 27, 2018.

(56) References Cited

U.S. PATENT DOCUMENTS

| | | | | |
|---|---|---|---|---|
| 10,753,906 | B2* | 8/2020 | Oh | G06F 3/14 |
| 11,520,041 | B1* | 12/2022 | Eubank | G06T 7/55 |
| 2012/0243689 | A1* | 9/2012 | Jeong | G06T 7/254 |
| | | | | 381/17 |
| 2013/0314497 | A1* | 11/2013 | Tsuchida | H04N 21/439 |
| | | | | 348/43 |
| 2013/0321620 | A1* | 12/2013 | Kim | G01S 13/88 |
| | | | | 348/135 |
| 2014/0055229 | A1* | 2/2014 | Amedi | A61H 3/061 |
| | | | | 340/4.1 |
| 2014/0270184 | A1* | 9/2014 | Beaton | H04S 7/307 |
| | | | | 381/17 |
| 2016/0070265 | A1* | 3/2016 | Liu | B64C 39/024 |
| | | | | 701/25 |
| 2016/0076937 | A1* | 3/2016 | Stuart | G01J 1/0271 |
| | | | | 250/349 |
| 2016/0187486 | A1* | 6/2016 | Chen | G01S 17/86 |
| | | | | 702/94 |
| 2016/0277863 | A1* | 9/2016 | Cahill | G01S 3/8083 |
| 2017/0148168 | A1* | 5/2017 | Lindner | G06T 7/593 |
| 2017/0154219 | A1* | 6/2017 | Shin | G06V 20/46 |
| 2018/0089848 | A1* | 3/2018 | Yang | G06T 7/521 |
| 2018/0096463 | A1* | 4/2018 | Kim | G06T 17/20 |
| 2018/0181195 | A1* | 6/2018 | Herman | G01S 17/86 |
| 2019/0129027 | A1* | 5/2019 | Stuart | G01S 15/86 |
| 2019/0197768 | A1* | 6/2019 | Taylor | G02B 27/017 |
| 2020/0410750 | A1* | 12/2020 | Huang | G01S 17/89 |

FOREIGN PATENT DOCUMENTS

| | | | | |
|---|---|---|---|---|
| JP | 2007048306 | A | 2/2007 | |
| WO | 2016033797 | A1 | 3/2016 | |
| WO | WO-2016033797 | A1* | 3/2016 | B64C 39/024 |

OTHER PUBLICATIONS

Smart Guiding Glasses for Visually Impaired People in Indoor Environment, Jinqiang Bai et al., IEEE, Aug. 2017, pp. 258-266 (Year: 2017).*

Feature Extraction Techniques for Recognizing Solid Objects with an Ultrasonic Range Sensor, Michael K. Brown, IEEE, 1985, pp. 191-205 (Year: 1985).*

Yu Zhang et al., "3D Reconstruction in the Presence of Glass and Mirrors by Acoustic and Visual Fusion," IEEE, Aug. 2018, pp. 1785-1796.

Jinqiang Bai et al., "Smart Guiding Glasses for Visually Impaired People in Indoor Environment," IEEE, Aug. 2017, pp. 258-266.

Michael K. Brown, "Feature Extraction Techniques for Recognizing Solid Objects with an Ultrasonic Range Sensor," 1985, pp. 191-205.

* cited by examiner

CORRECTING DEPTH ESTIMATIONS DERIVED FROM IMAGE DATA USING ACOUSTIC INFORMATION

CROSS REFERENCE TO RELATED APPLICATIONS

This application is a continuation of U.S. patent application Ser. No. 16/580,337, filed on Sep. 24, 2019, which claims the benefit of U.S. Provisional Patent Application No. 62/737,614, filed Sep. 27, 2018, which are both hereby incorporated by reference in their entirety.

TECHNICAL FIELD

The present disclosure generally relates to mapping real-world environments, and in particular to improving depth estimation in real-world world environments.

BACKGROUND

Various computer applications, such as computer-generated reality (CGR) applications and robotic applications, map real-world environments. Mapping real-world environments often includes depth estimation, which includes determining a distance to a surface or an object from a particular origin. Existing computer applications continue to face challenges with accurate depth estimations when mapping real-world environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
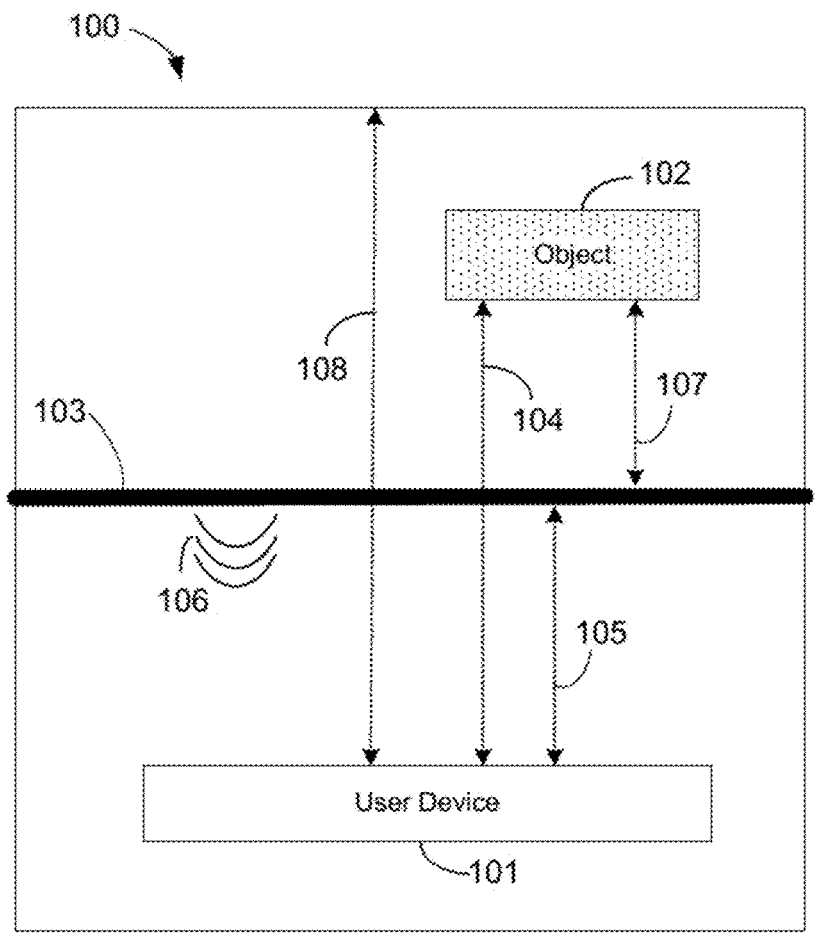
FIGS. 1A-1B illustrate operational examples in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for correcting depth estimations derived from image data using acoustic information. According to some implementations, the method is performed at a device with one or more processors, non-transitory memory, and an audio transceiver. The method also includes: obtaining a first depth estimation characterizing a distance between the device and a surface in a real-world environment, wherein the first depth estimation is derived from image data including a representation of the surface; receiving, using the audio transceiver, an acoustic reflection of an acoustic wave, wherein the acoustic wave is transmitted in a known direction relative to the device; and determining a second depth estimation based on the acoustic reflection, wherein the second depth estimation characterizes the distance between the device and the surface in the real-world environment; and determining a confirmed depth estimation characterizing the distance between the device and the surface based on resolving any mismatch between the first depth estimation and the second depth estimation.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In previously available systems, image data is used to derive depth estimations characterizing real-world spaces represented within the image data. Depth estimations derived from image data may be unreliable if the environment includes mirrored surfaces or transparent surfaces (e.g., glass walls). Mirrored surfaces are visually reflective and present images of objects that do not exist in the presented location. Transparent surfaces are visually transparent and may be difficult to detect using image data. However, both mirrored surfaces and transparent surfaces tend to be highly reflective of acoustic waves. This innovation uses the acoustic reflection properties of mirrored surfaces and transparent surfaces to correct depth estimations derived from image data.

Figure 1B:
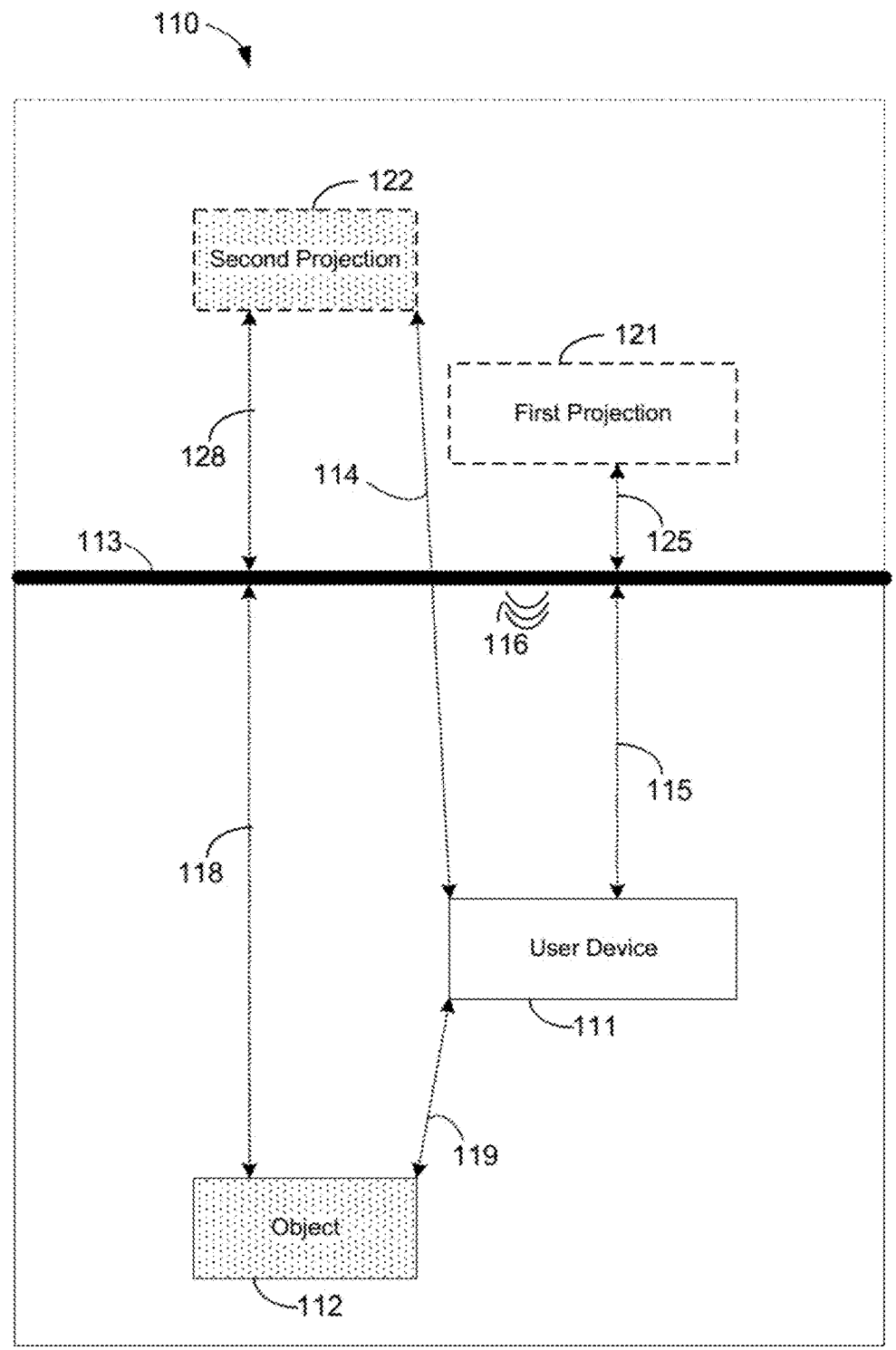

FIGS. 1A-1B illustrate operational examples in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, FIG. 1A illustrates an operating example that includes an environment 100 with a transparent surface 103 (e.g., a window), while FIG. 1B illustrates an operating example that includes an environment 110 with a mirrored surface 113.

The environment 100 illustrated in FIG. 1A includes, in addition to the transparent surface 103, a user device 101 (e.g., a head-mounted device worn by a user, a mobile device held by a user, a robot, or the like) and an object 102 (e.g., an article of furniture or the like). In this example, the user device 101 is at a location on a front side of the transparent surface 103 and with a distance 105 from the transparent surface 103. The object 102 is at a location on a back side of the transparent surface 103 and with a distance 107 from the transparent surface 103. Thus, the transparent surface 103 is located in between the user device 101 and the object 102.

In some implementations, a depth estimating device (e.g., the controller 210 in FIGS. 2-3, the HMD 220 in FIGS. 2 and 4, or a combination thereof; or the robotic device controller 510 in FIGS. 5-6, the robotic device 520 in FIGS. 5 and 7, or a combination thereof) is configured to estimate a depth associated with the environment 100, e.g., a depth of the environment 100 from the origin (THE ORIGIN) of the user device 101 or a depth of the object 102 from THE ORIGIN of the user device 101. As such, detecting the transparent surface 103 may be relevant to estimating the depths associated with the environment 100 because the transparent surface 103 is located within the environment 100 and in between the user device 101 and the object 102.

For example, if the depth estimating device successfully detects the transparent surface 103 based on image data, the depth estimating device may estimate that the depth of the environment 100 from THE ORIGIN of the user device 101 is equal to the distance 105. However, if the depth estimating device fails to successfully detect the transparent surface 103 based on image data, the depth estimating device may estimate that the depth of the environment 100 from THE ORIGIN of the user device 101 is equal to the distance 108, an estimation that may ignore a blocking effect by the transparent surface 103.

As another example, if the depth estimating device successfully detects the transparent surface 103 based on image data, the depth estimating device may estimate that the depth of the object 102 from THE ORIGIN of the user device 101 is infinity or indeterminate, as the transparent surface 103 blocks a path between the user device 101 and the object 102. However, if the depth estimating device fails to successfully detect the transparent surface 103 based on image data, the depth estimating device may estimate that the depth of the object 102 from THE ORIGIN of the user device 111 is equal to the distance 104, an estimation that may ignore a blocking effect by the transparent surface 103.

However, the transparent surface 103 are typically difficult to detect using image data alone due to its transparent qualities. As one example, transparent surfaces do not reflect light waves used to capture images. However, transparent surfaces are reflective with respect to acoustic waves. The depth estimating device can use this acoustical reflective property of transparent surfaces to detect the transparent surface 103. For example, the depth estimating device can analyze a reflection acoustic wave 106, which is reflection of a primary acoustic wave (not shown) from a known origin (e.g., from an acoustic wave generation unit of the user device 101, or the user of the user device 101), to detect the transparent surface 103. To do so, the depth estimating device may analyze the reflection acoustic wave 106 to determine if a potential surface has reflected most or all of the primary acoustic wave. As such, as one example, if the depth estimating device successfully detects the transparent surface 103 based on the reflection acoustic wave 106, the depth estimating device may estimate that the depth of the environment 100 from THE ORIGIN of the user device 101 is equal to the distance 105.

The environment 110 illustrated in FIG. 1B includes, in addition to the mirrored surface 113, a user device 111 (e.g., a head-mounted device worn by a user, a mobile device held by a user, a robot, or the like) and an object 112 (e.g., an article of furniture or the like). The user device 111 is at a location with a distance 115 to the mirrored surface 113. The object 112 is at a location behind the user device 111 and with a distance 118 to the mirrored surface 113 and a distance 119 to the user device 111. The mirrored surface 113 depicts a first projection 121 of the user device 111 with a projected distance 125, a distance which (depending on the type of the mirrored surface 113) may or may not be equal to the distance 115 between the mirrored surface 113 and the user device 111. The mirrored surface 113 further depicts a second projection 122 of the object 112 with a projected distance 128, a distance which (depending on the type of the mirrored surface 113) may or may not be equal to the distance 115 between the mirrored surface 113 and the object 112.

In some implementations, a depth estimating device (e.g., the controller 210 in FIGS. 2-3, the HMD 220 in FIGS. 2 and 4, or a combination thereof; or the robotic device controller 510 in FIGS. 5-6, the robotic device 520 in FIGS. 5 and 7, or a combination thereof) is configured to estimate a depth associated with the environment 110, for example a depth of the environment 110 from THE ORIGIN of the user device 111 or a depth of the object 112 from THE ORIGIN of the user device 111. As such, detecting the presence of the mirrored surface 113 may be relevant to estimating depths associated with the environment 110 because the mirrored surface 113 depicts projections (or virtual images).

For example, if the depth estimating device successfully detects the mirrored surface 113 based on image data, the depth estimating device may estimate that the depth of the environment 110 from THE ORIGIN of the user device 111 is equal to the distance 115 between the user device 111 and the mirrored surface 113. However, if the depth estimating device fails to successfully detect the mirrored surface 113 based on image data, the depth estimating device may estimate that the depth of the environment 100 from THE ORIGIN of the user device 111 is equal to an addition of: (i) the distance 115 between the user device 111 and the mirrored surface 113; and (ii) the projected distance 125 of the first projection 121 depicted by the mirrored surface 113.

As another example, if the depth estimating device successfully detects the mirrored surface 113 based on image data, the depth estimating device may estimate that the depth of the object 112 from THE ORIGIN of the user device 111 is equal to the distance 119 between the user device 111 and the object 112. However, if the depth estimating device fails to successfully detect the mirrored surface 113 based on image data, the depth estimating device may estimate that the depth of the object 112 from THE ORIGIN of the user device 111 is equal to the distance 114 between the user device 111 and the second projection 122 of the object 112.

Similar to transparent surfaces, typically, mirrored surfaces are also not sufficiently reflective of light waves used to capture images. However, mirrored surfaces are reflective with respect to acoustic waves. The depth estimating device can use this acoustical reflective property of mirrored surfaces to detect the mirrored surface 113. For example, the depth estimating device can analyze a reflection acoustic wave 116, which is reflection of a primary acoustic wave (not shown) from a known origin (e.g., from an acoustic wave generation unit of the user device 111, or the user of the user device 111), to detect the mirrored surface 113. To do so, the depth estimating device may analyze the reflection acoustic wave 116 to determine if a potential surface has reflected most or all of the primary acoustic wave. As such, as one example, if the depth estimating device successfully detects the mirrored surface 113 based on the reflection acoustic wave 116, the depth estimating device may estimate that the depth of the environment 110 from THE ORIGIN of the user device 111 is equal to the distance 115.

Figure 2:
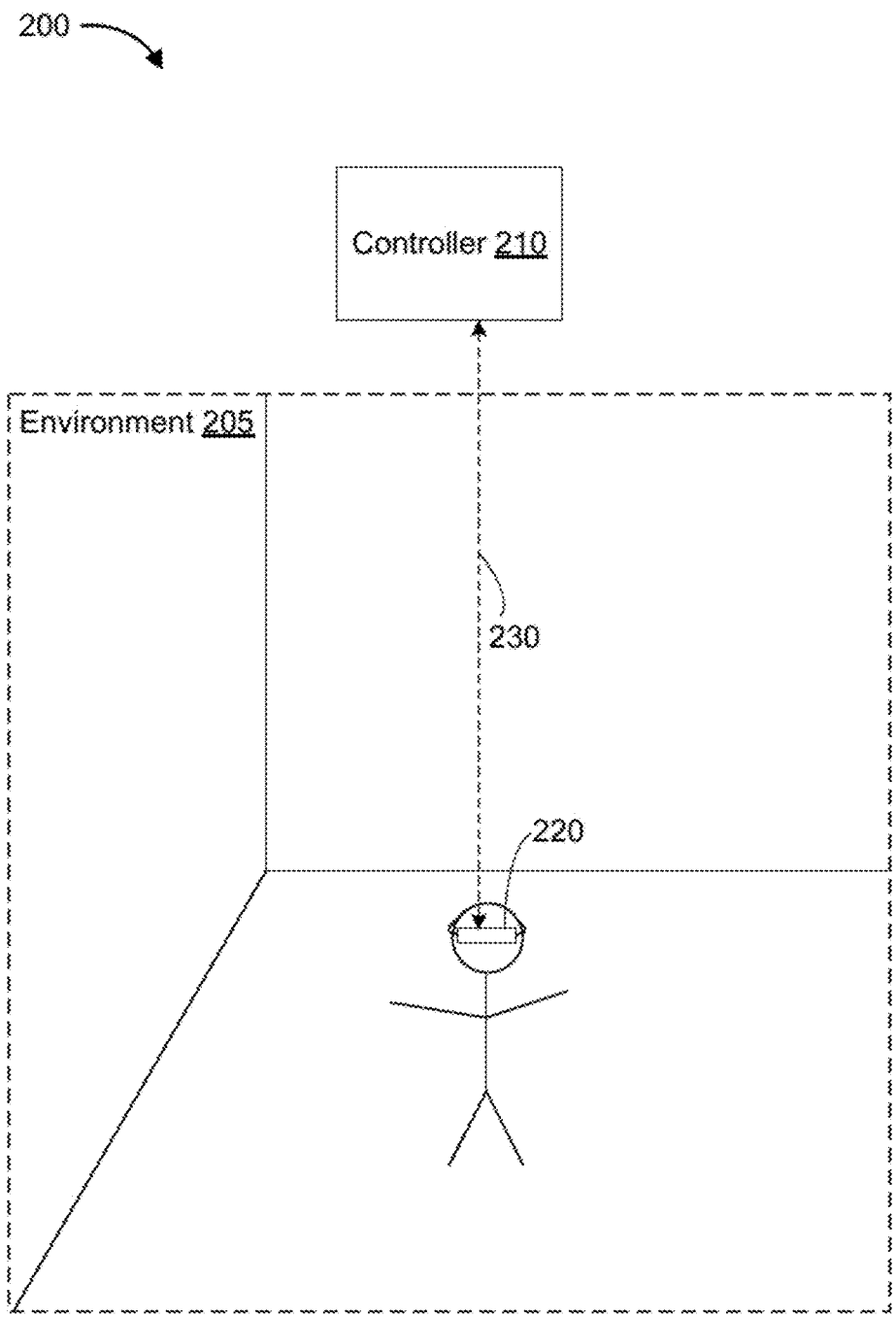
FIG. 2 is a block diagram of an example operating environment in accordance with some implementations.

FIG. 2 is a block diagram of an example operating environment 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 200 includes a controller 210 and a head-mounted device (HMD) 220.

In some implementations, the controller 210 is configured to manage and coordinate a computer-generated reality (CGR) experience for the user. In some implementations, the controller 210 includes a suitable combination of software, firmware, and/or hardware. The controller 210 is described in greater detail below with respect to FIG. 3. In some implementations, the controller 210 is a computing device that is local or remote relative to the environment 205. For example, the controller 210 may be a local server situated within the environment 205. In another example, the controller 210 is a remote server situated outside of the environment 205 (e.g., a cloud server, central server, etc.). In some implementations, the controller 210 is communicatively coupled with the HMD 220 via a wired or wireless communication channel 144 (e.g., BLUETOOTH, Institute of Electrical and Electronics Engineers (IEEE) 802.11x, IEEE 802.16x, IEEE 802.3x, etc.).

In some implementations, the HMD 220 is configured to present a CGR experience to the user. In some implementations, the HMD 220 includes a suitable combination of software, firmware, and/or hardware. The HMD 220 is described in greater detail below with respect to FIG. 4. In some implementations, the functionalities of the controller 210 are provided by and/or combined with the HMD 220.

According to some implementations, the HMD 220 presents a CGR experience to the user while the user is virtually and/or physically present within the environment 205. In some implementations, while presenting an augmented reality (AR) experience, the HMD 220 is configured to present AR content and to enable optical see-through of the environment 205. In some implementations, while presenting a virtual reality (VR) or mixed reality (MR) experience, the HMD 220 is configured to present VR or MR content and to enable video pass-through of the environment 205.

In some implementations, the user wears the HMD 220 on his/her head. As such, the HMD 220 includes one or more CGR displays provided to display the CGR content. For example, the HMD 220 encloses the field-of-view of the user. In some implementations, the HMD 220 is replaced with a CGR chamber, enclosure, or room configured to present CGR content in which the user does not wear the HMD 220.

Figure 3:
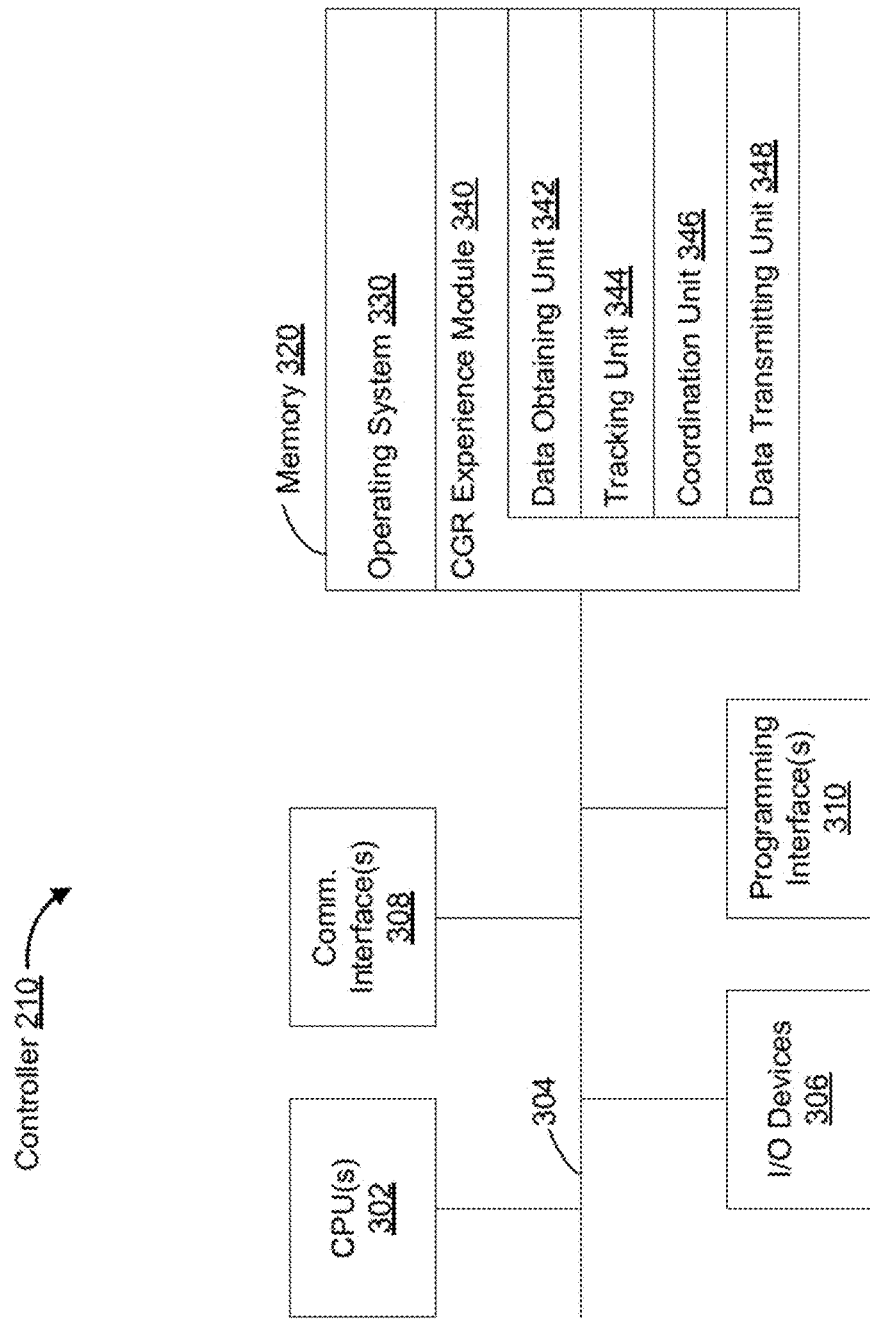
FIG. 3 is a block diagram of an example controller in accordance with some implementations.

FIG. 3 is a block diagram of an example of the controller 210 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 210 includes one or more processing units 302 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 306, one or more communication interfaces 308 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 310, a memory 320, and one or more communication buses 304 for interconnecting these and various other components.

In some implementations, the one or more communication buses 304 include circuitry that interconnects and controls communications between system components. In some implementations, the one or more I/O devices 306 include at least one of a keyboard, a mouse, a touchpad, a joystick, one or more microphones, one or more speakers, one or more image sensors, one or more displays, and/or the like.

The memory 320 includes high-speed random-access memory, such as dynamic random-access memory (DRAM), static random-access memory (SRAM), double-data-rate random-access memory (DDR RAM), or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR experience module 340.

The operating system 330 includes procedures for handling various basic system services and for performing hardware dependent tasks. In some implementations, the CGR experience module 340 is configured to manage and coordinate one or more CGR experiences for one or more users (e.g., a single CGR experience for one or more users, or multiple CGR experiences for respective groups of one or more users). To that end, in various implementations, the CGR experience module 340 includes a data obtaining unit 342, a tracking unit 344, a coordination unit 346, and a data transmitting unit 348.

In some implementations, the data obtaining unit 342 is configured to obtain data (e.g., presentation data, interaction data, sensor data, location data, image data, acoustic data, etc.) from the HMD 220. To that end, in various implementations, the data obtaining unit 342 includes instructions and/or logic therefor, and heuristics and metadata therefor.

In some implementations, the tracking unit 344 is configured to map the environment 205 and to track the position/location of the HMD 220 with respect to the environment 205. For example, the tracking unit 344 may be configured to estimate a depth associated with the environment 205 based on sensor data (e.g., at least one of image data and acoustic data) obtained by the data obtaining unit 342. To that end, in various implementations, the tracking unit 344 includes instructions and/or logic therefor, and heuristics and metadata therefor.

In some implementations, the coordination unit 346 is configured to manage and coordinate the CGR experience presented to the user by the HMD 220. To that end, in various implementations, the coordination unit 346 includes instructions and/or logic therefor, and heuristics and metadata therefor.

In some implementations, the data transmitting unit 348 is configured to transmit data (e.g., presentation data, location data, etc.) to the HMD 220. To that end, in various implementations, the data transmitting unit 348 includes instructions and/or logic therefor, and heuristics and metadata therefor.

Although the data obtaining unit 342, the tracking unit 344, the coordination unit 346, and the data transmitting unit 348 are shown as residing on a single device (e.g., the controller 210), it should be understood that in other implementations, any combination of the data obtaining unit 342, the tracking unit 344, the coordination unit 346, and the data transmitting unit 348 may be located in separate computing devices.

Moreover, FIG. 3 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
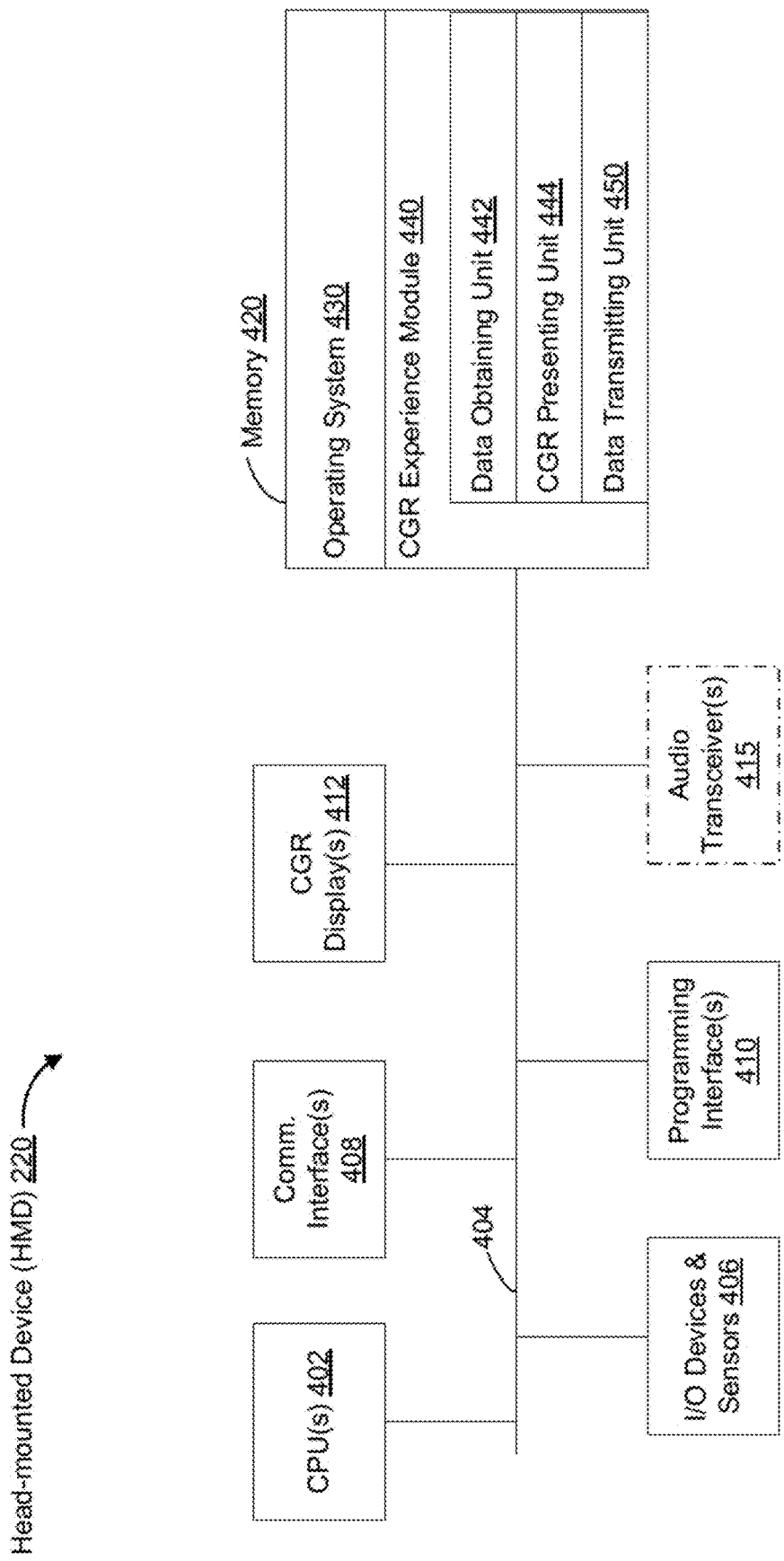
FIG. 4 is a block diagram of an example head-mounted device (HMD) in accordance with some implementations.

FIG. 4 is a block diagram of an example the head-mounted device (HMD) 220 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the HMD 220 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more optional audio transceivers 415, one or more programming (e.g., I/O) interfaces 410, one or more CGR displays 412, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one image sensor (e.g., one or more external-facing image sensors and/or one or more internal-facing image sensors)) and at least one audio transceiver. In some implementations, the one or more I/O devices and sensors 406 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like.

In some implementations, the one or more CGR displays 412 are configured to present the CGR experience to the user. In some implementations, the one or more CGR displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 412 correspond to diffractive, reflective, polarized, holographic, etc. waveguide displays. For example, the HMD 220 may include a single CGR display. In another example, the HMD 220 may include a CGR display for each eye of the user. In some implementations, the one or more CGR displays 412 are capable of presenting AR, MR, and VR content. In some implementations, the one or more CGR displays 412 are capable of presenting AR, MR, or VR content.

In some implementations, the one or more optional audio transceivers 415 include circuitry configured to generate and transmit an audio signal in the environment 205. For example, the one or more audio transceivers 415 may be includes an amplitude modulation audio transmitter, a frequency modulation audio transmitter, amplitude-shift keying audio transmitter, frequency-shift keying audio transmitter, phase-shift keying audio transmitter, or the like. In some implementations, the one or more audio transceivers 415 include one or more amplifiers. In some implementations, the one or more audio transceivers 415 include one or more antennas.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a CGR experience module 440.

The operating system 430 includes procedures for handling various basic system services and for performing hardware dependent tasks. In some implementations, the CGR experience module 440 is configured to present CGR content to the user via the one or more CGR displays 412. To that end, in various implementations, the CGR experience module 440 includes a data obtaining unit 442, a CGR presenting unit 444, and a data transmitting unit 450.

In some implementations, the data obtaining unit 442 is configured to obtain data (e.g., presentation data, interaction data, sensor data, location data, etc.) from the controller 110. To that end, in various implementations, the data obtaining unit 442 includes instructions and/or logic therefor, and heuristics and metadata therefor.

In some implementations, the CGR presenting unit 444 is configured to present CGR content via the one or more CGR displays 412. To that end, in various implementations, the CGR presenting unit 444 includes instructions and/or logic therefor, and heuristics and metadata therefor.

In some implementations, the data transmitting unit 450 is configured to transmit data (e.g., presentation data, location data, image data, acoustic data, etc.) to the controller 210. To that end, in various implementations, the data transmitting unit 450 includes instructions and/or logic therefor, and heuristics and metadata therefor.

Although the data obtaining unit 442, the CGR presenting unit 444, and the data transmitting unit 450 are shown as residing on a single device (e.g., the HMD 220), it should be understood that in other implementations, any combination of the data obtaining unit 442, the CGR presenting unit 444, and the data transmitting unit 450 may be located in separate computing devices.

Moreover, FIG. 4 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 5:
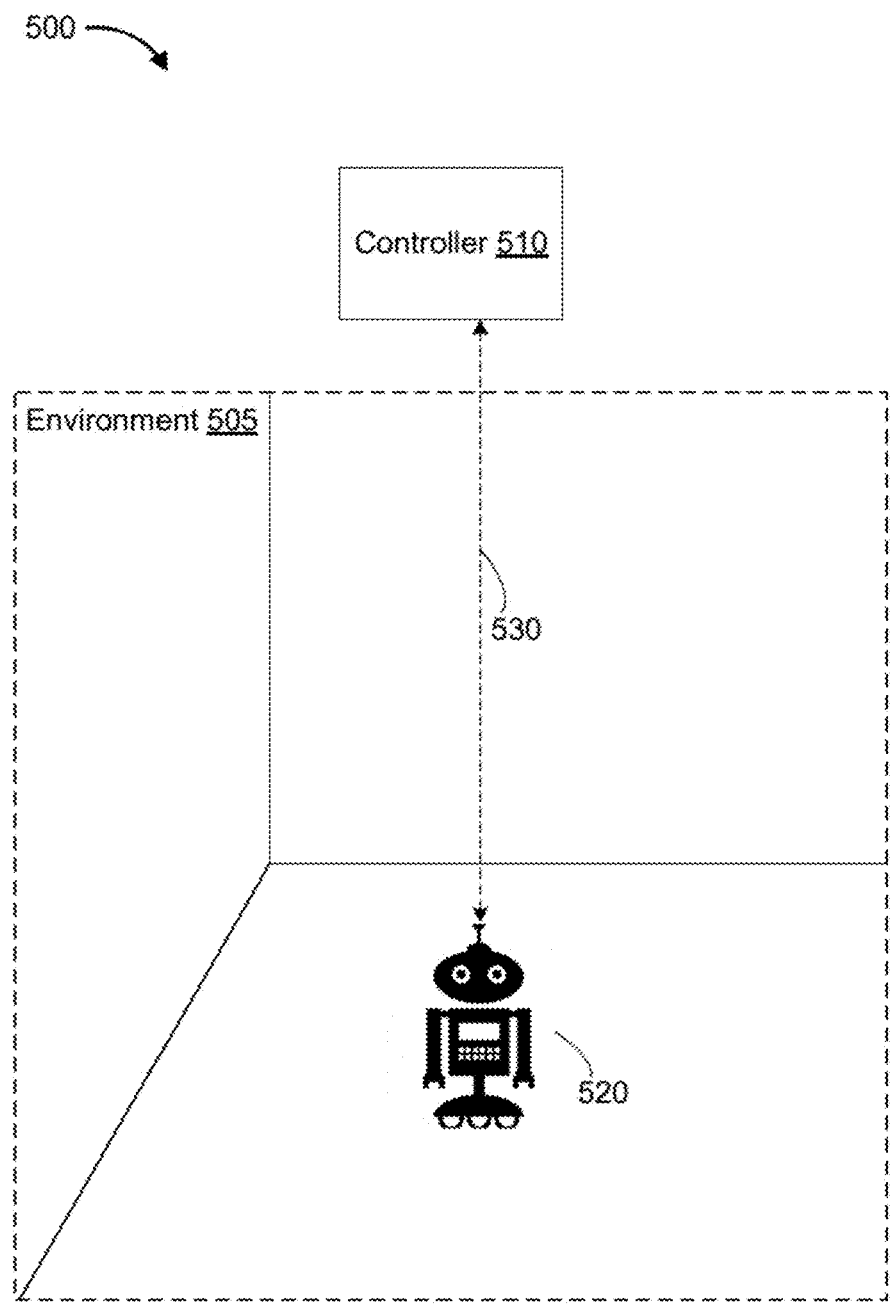
FIG. 5 is a block diagram of another example operating environment in accordance with some implementations.

FIG. 5 is a block diagram of an example operating environment 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 500 includes a robotic device controller 510 and a robotic device 520 (sometimes also referred to herein as a "robotic agent").

In some implementations, the robotic device controller 510 is configured to manage and coordinate the robotic device 520. In some implementations, the robotic device controller 510 includes a suitable combination of software, firmware, and/or hardware. The robotic device controller 510 is described in greater detail below with respect to FIG. 6. In some implementations, the robotic device controller 510 is a computing device that is local or remote relative to the environment 505. For example, the robotic device controller 510 may be a local server situated within the environment 505. In another example, the robotic device controller 510 is a remote server situated outside of the environment 505 (e.g., a cloud server, central server, etc.). In some implementations, the robotic device controller 510 is communicatively coupled with the robotic device 520 via a wired or wireless communication channel 544 (e.g., BLUETOOTH, IEEE 802.11x, IEEE 802.16x, IEEE 802.3x, etc.).

In some implementations, the robotic device 520 is configured to perform actions in accordance with data received from the robotic device controller 510. In some implementations, the robotic device 520 includes a suitable combination of software, firmware, and/or hardware. The robotic device 520 is described in greater detail below with respect to FIG. 7. In some implementations, the functionalities of the robotic device controller 510 are provided by and/or combined with the robotic device 520. Non-limiting examples of the robotic device 520 include: an autonomous vehicle, an unmanned aerial vehicle (UAV), an autonomous appliance, an electronic toy, or the like.

Figure 6:
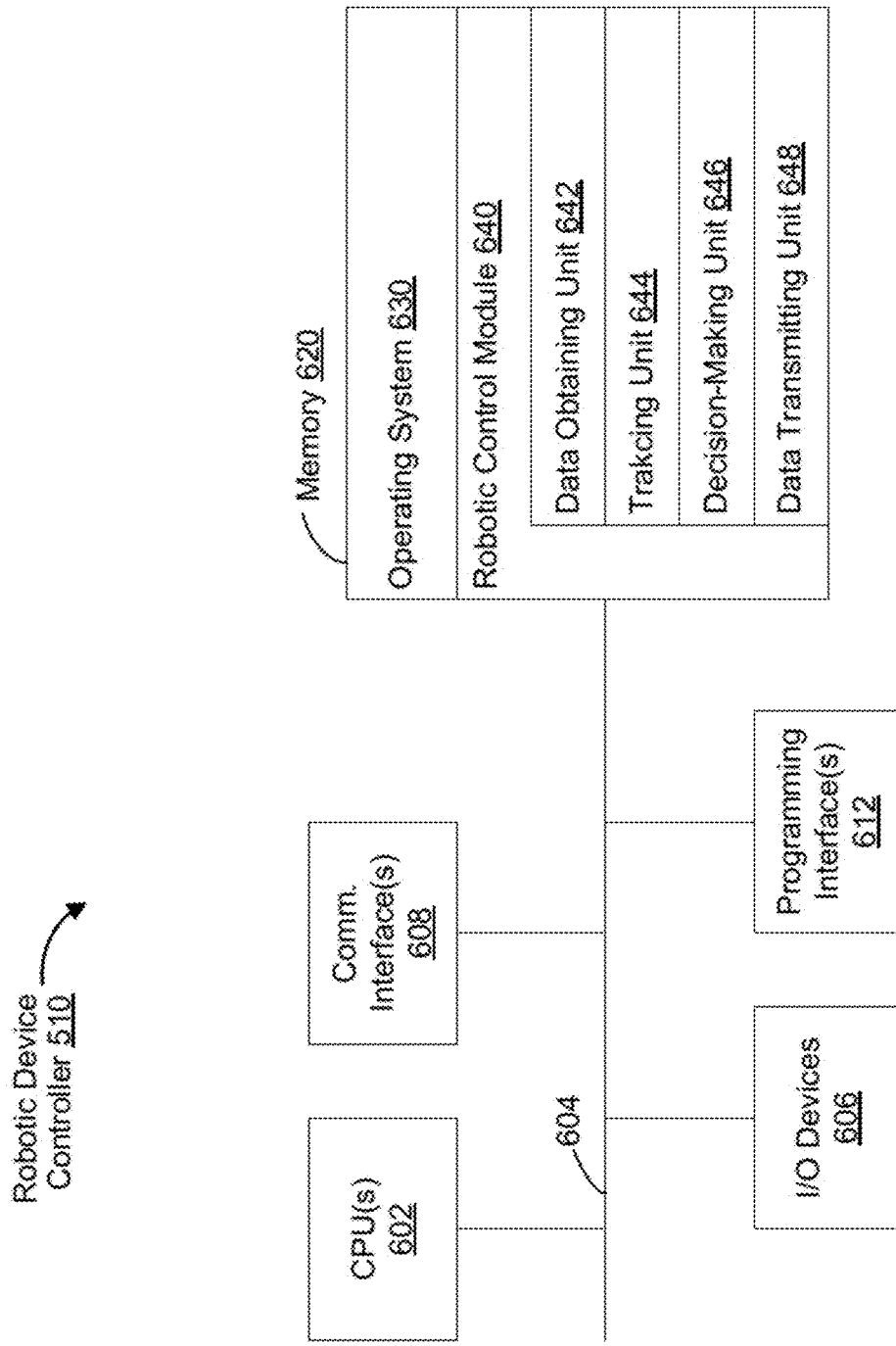
FIG. 6 is a block diagram of an example robotic device controller in accordance with some implementations.

FIG. 6 is a block diagram of an example of the robotic device controller 510 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the robotic device controller 510 includes one or more processing units 602 (e.g., microprocessors, ASICs, FPGAs, GPUs, CPUs, processing cores, and/or the like), one or more I/O devices 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 612, a memory 620, and one or more communication buses 604 for interconnecting these and various other components.

In some implementations, the one or more communication buses 604 include circuitry that interconnects and controls communications between system components. In some implementations, the one or more I/O devices 606 include at least one of a keyboard, a mouse, a touchpad, a joystick, one or more microphones, one or more speakers, one or more image sensors, one or more displays, and/or the like.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and a robotic control module 640.

The operating system 630 includes procedures for handling various basic system services and for performing hardware dependent tasks. In some implementations, the robotic control module 640 is configured to manage and coordinate the actions of the robotic device 520 in the environment 505. To that end, in various implementations, the robotic control module 640 includes a data obtaining unit 642, a tracking unit 644, a decision-making unit 646, and a data transmitting unit 648.

In some implementations, the data obtaining unit 642 is configured to obtain data (e.g., presentation data, interaction data, sensor data, location data, image data, acoustic data, etc.) from the robotic device 520. To that end, in various implementations, the data obtaining unit 642 includes instructions and/or logic therefor, and heuristics and metadata therefor.

In some implementations, the tracking unit 644 is configured to map the environment 505 and to track the position/location of the robotic device 520 with respect to the environment 505. For example, the tracking unit 644 may be configured to estimate a depth associated with the environment 505 based on sensor data (e.g., at least one of image data and acoustic data) obtained by the data obtaining unit 642. To that end, in various implementations, the tracking unit 644 includes instructions and/or logic therefor, and heuristics and metadata therefor.

In some implementations, the decision-making unit 646 is configured to determine an action for the robotic device 520 based at least in part on the map of the environment 605 and/or the position/location of the robotic device 520 with respect to the environment 605. To that end, in various implementations, the decision-making unit 646 includes instructions and/or logic therefor, and heuristics and metadata therefor.

In some implementations, the data transmitting unit 648 is configured to transmit data (e.g., presentation data, location data, commands, etc.) to the robotic device 520. To that end, in various implementations, the data transmitting unit 648 includes instructions and/or logic therefor, and heuristics and metadata therefor.

Although the data obtaining unit 642, the tracking unit 644, the decision-making unit 646, and the data transmitting unit 648 are shown as residing on a single device (e.g., the controller 510), it should be understood that in other implementations, any combination of the data obtaining unit 642, the tracking unit 644, the decision-making unit 646, and the data transmitting unit 648 may be located in separate devices.

Moreover, FIG. 6 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 7:
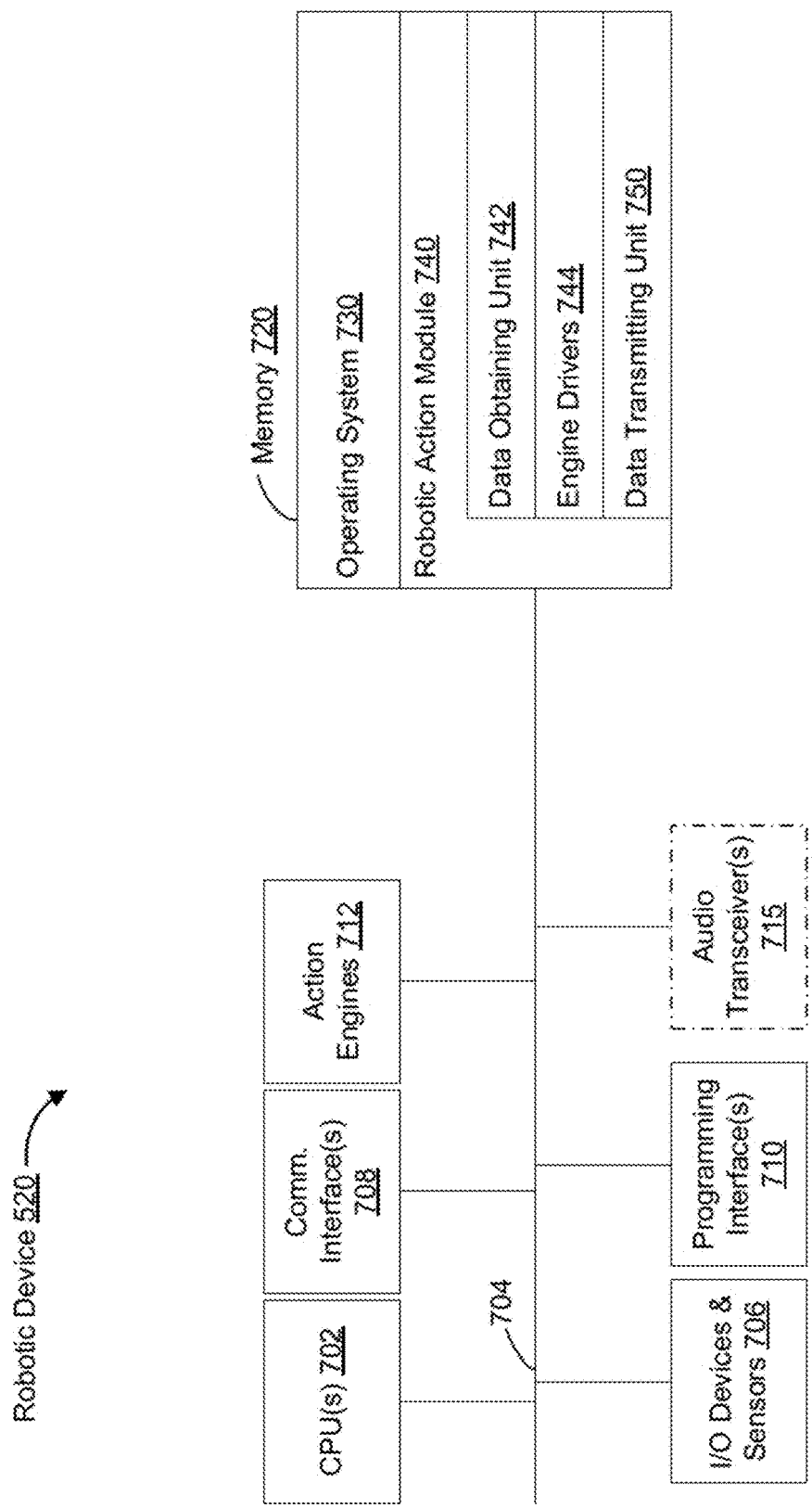
FIG. 7 is a block diagram of an example robotic device in accordance with some implementations.

FIG. 7 is a block diagram of an example the robotic device 520 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the robotic device 520 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more optional audio transceivers 715, one or more programming (e.g., I/O) interfaces 710, one or more action engines 712, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one image sensor (e.g., a camera) and at least one audio transceiver. In some implementations, the one or more I/O devices and sensors 706 include at least one of an inertial measurement unit (IMU), an accelerometer, a gyroscope, a thermometer, one or more microphones, one or more speakers, a haptics engine, and/or the like. In some implementations, the one or more action engines 712 include mechanical components such as motors, pistons, grippers, wheels, gears, and/or the like.

In some implementations, the one or more optional audio transceivers 715 include circuitry configured to generate, transmit, and receive audio signals in the environment 505. For example, the one or more audio transceivers 715 may include an amplitude modulation audio transmitter, a frequency modulation audio transmitter, amplitude-shift keying audio transmitter, frequency-shift keying audio transmitter, phase-shift keying audio transmitter, or the like. In some implementations, the one or more audio transceivers 715 include one or more amplifiers. In some implementations, the one or more audio transceivers 715 include one or more antennas.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 420 or the non-transitory computer readable storage medium of the memory 720 stores the following programs, modules and data structures, or a subset thereof including an optional operating system 730 and a robotic action module 740.

The operating system 730 includes procedures for handling various basic system services and for performing hardware dependent tasks. In some implementations, the robotic action module 740 is configured to manage and coordinate actions of the one or more action engines 712. To that end, in various implementations, the robotic action module 740 includes a data obtaining unit 742, engine drivers 744, and a data transmitting unit 750.

In some implementations, the data obtaining unit 742 is configured to obtain data (e.g., presentation data, interaction data, sensor data, location data, commands, etc.) from the robotic device controller 510. To that end, in various implementations, the data obtaining unit 742 includes instructions and/or logic therefor, and heuristics and metadata therefor.

In some implementations, an engine driver 744 is configured to cause an action engine 712 to perform a particular action (e.g., based on commands from the robotic controller 510). To that end, in various implementations, each engine driver 744 includes instructions and/or logic therefor, and heuristics and metadata therefor.

In some implementations, the data transmitting unit 750 is configured to transmit data (e.g., presentation data, location data, image data, acoustic data, etc.) to the robotic device controller 510. To that end, in various implementations, the data transmitting unit 750 includes instructions and/or logic therefor, and heuristics and metadata therefor.

Although the data obtaining unit 742, the engine drivers 744, and the data transmitting unit 750 are shown as residing on a single device, it should be understood that in other implementations, any combination of the data obtaining unit 742, the engine drivers 744, and the data transmitting unit 750 may be located in separate computing devices.

Moreover, FIG. 7 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 8:
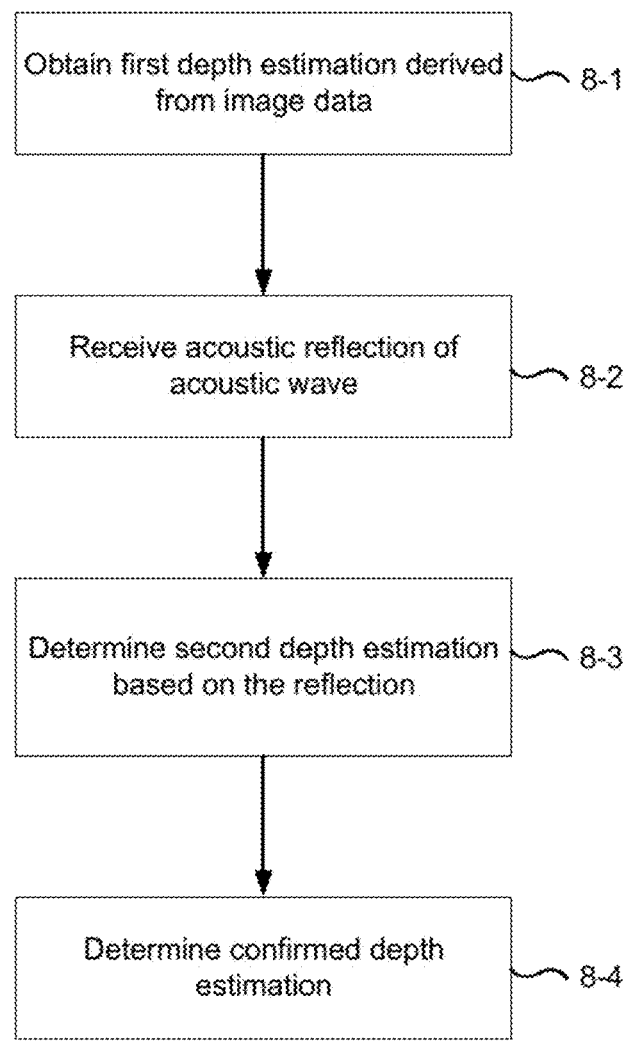
FIG. 8 is a flowchart representation of a method of correcting depth estimations derived from image data using acoustic information in accordance with some implementations.

FIG. 8 is a flowchart representation of a method 800 of correcting depth estimations derived from image data using acoustic information in accordance with some implementations. In various implementations, the method 800 is performed by a device (e.g., the controller 210 in FIGS. 2-3, the HMD 220 in FIGS. 2 and 4, or a combination thereof; or the robotic device controller 510 in FIGS. 5-6, the robotic device 520 in FIGS. 5 and 7, or a combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory).

As represented by block 8-1, the method 800 includes obtaining a first depth estimation derived from image data. In some implementations, the first depth estimation characterizes a distance between the device and a surface or object in a real-world environment derived from image data including a representation of the surface or object. In some implementations, the device includes an image sensor, and the method 800 further includes obtaining the image data using the image sensor. In some implementations, the method 800 further includes determining the first depth estimation from the image data. In some implementations, determining the first depth estimation from the image data includes: (i) determining, in each image of at least some of the one or more images in the image data, an anchor point indicating a location of the surface in the respective image; and (ii) computing the first depth estimation to minimize the disparity between each anchor point in each image.

As represented by block 8-2, the method 800 includes receiving (e.g., using an audio transceiver of the device) an acoustic reflection of an acoustic wave (e.g., acoustic information). In some implementations, the acoustic wave is transmitted in a known direction relative to the device. In some implementations, the acoustic wave is transmitted from the device using an audio transceiver (e.g., the one of more audio transceivers 415 of the HMD 220 in FIGS. 2 and 4, or the one of more audio transceivers 715 of the robotic device 520 in FIGS. 5 and 7). In some implementations, the device further includes an audio transceiver, and the method 800 includes generating and transmitting the acoustic wave using the audio transceiver and receiving an acoustic reflection of the acoustic wave. In some implementations, the acoustic wave corresponds to speech or other audible sounds from a user in the real-world environment (e.g., the user of the HMD 220 in FIGS. 2 and 4). In some implementations, the acoustic wave corresponds to audio from a robotic device in the real-world environment (e.g., the robotic device 520 in FIGS. 5 and 7). In some implementations, the acoustic wave corresponds to audio from an audio generating source in the real-world environment (e.g., an animal, alarm system, appliance, stereo, or the like).

As represented by block 8-3, the method 800 includes determining a second depth estimation based on the acoustic reflection. In some implementations, the second depth estimation characterizes the distance between the device and the surface or object in the real-world environment. In some implementations, the device analyzes the acoustic reflection of the acoustic wave to determine to what extent the acoustic wave has been absorbed by surfaces or objects in the real-world environment (i.e., the absorption rate of the acoustic wave). In some implementations, the device determines whether the environment includes a transparent surface or a mirrored surface based on the absorption rate of the acoustic wave.

As represented by block 8-4, the method 800 includes determining a confirmed depth estimation characterizing a distance between the device and a surface or object in a real-world environment. In some implementations, determining the confirmed path estimation includes, in response to determining that the difference between the first depth estimation and the second depth estimation exceeds a threshold value (e.g., an absolute value, deterministic value, soft value, or the like), resolving any mismatch between the first depth estimation and the second depth estimation.

In some implementations, the device determines a confirmed depth estimation based on resolving any mismatch between the first depth estimation and the second depth estimation. In some implementations, determining the confirmed depth estimation based on resolving any mismatch between the first depth estimation and the second depth estimation includes determining the confirmed depth estimation based on processing the first depth estimation and the second depth estimation depth estimation in accordance with a visual odometry procedure. In some implementations, determining the confirmed depth estimation based on resolving any mismatch between the first depth estimation and the second depth estimation includes selecting the second depth as the confirmed depth estimation.

Figure 9A:
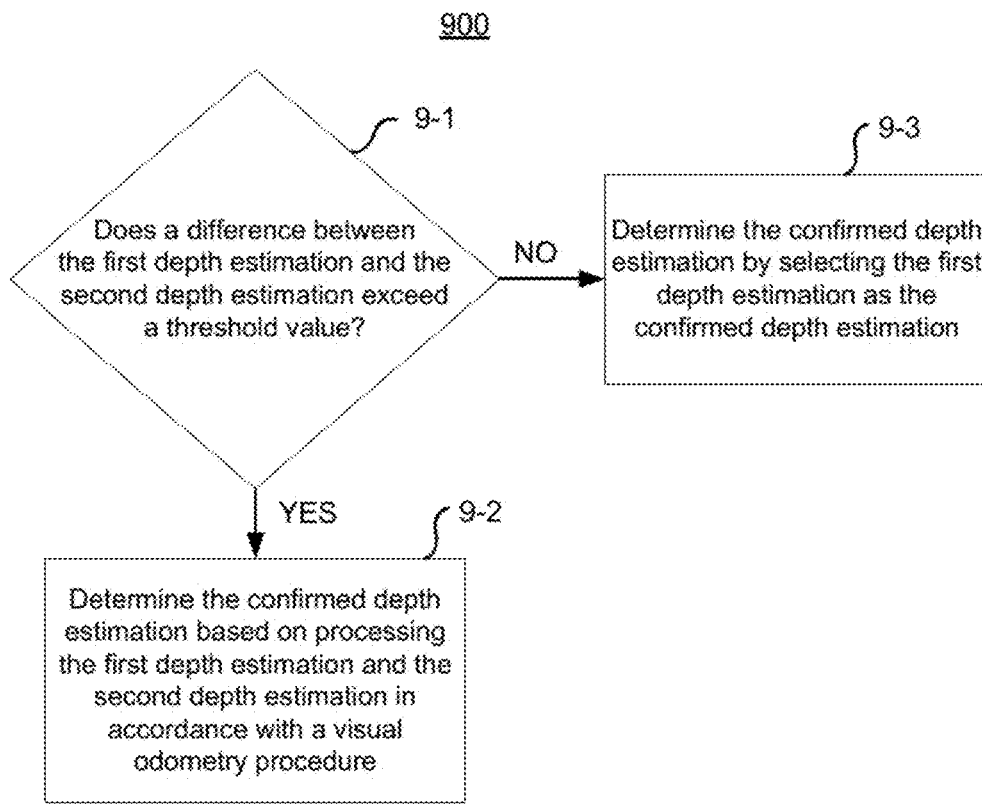
FIG. 9A is a flowchart representation of a method of determining a confirmed depth estimation in accordance with some implementations.

FIG. 9A is a flowchart representation of a method 900 of determining a confirmed depth estimation in accordance with some implementations. In various implementations, the method 900 is performed by a device (e.g., the controller 210 in FIGS. 2-3, the HMD 220 in FIGS. 2 and 4, or a combination thereof; or the robotic device controller 510 in FIGS. 5-6, the robotic device 520 in FIGS. 5 and 7, or a combination thereof). In some implementations, the method 900 is performed by processing logic, including hardware, firmware, software, or a combination thereof. In some implementations, the method 900 is performed by a processor executing code stored in a non-transitory computer-readable medium (e.g., a memory).

As represented by block 9-1, the method 900 includes determining whether or not a difference between a first depth estimation and a second depth estimation exceeds a threshold value (e.g., an absolute value, deterministic value, soft value, or the like).

If the difference between the first depth estimation and the second depth estimation exceeds the threshold value (the "YES" path from block 9-1), the method 900 includes, as represented by block 9-2, determining the confirmed depth estimation based on processing the first depth estimation and the second depth estimation depth estimation in accordance with a visual odometry procedure. Alternatively and/or additionally, the method 900 includes determining the confirmed depth estimation based on processing the first depth estimation and the second depth estimation depth estimation in accordance with a visual simultaneous localization and mapping (SLAM) procedure.

If the difference between the first depth estimation and the second depth estimation does not exceed the threshold value (the "NO" path from block 9-1), the method 900 includes, as represented by block 9-3, determining the confirmed depth estimation by selecting the first depth estimation as the confirmed depth estimation.

Figure 9B:
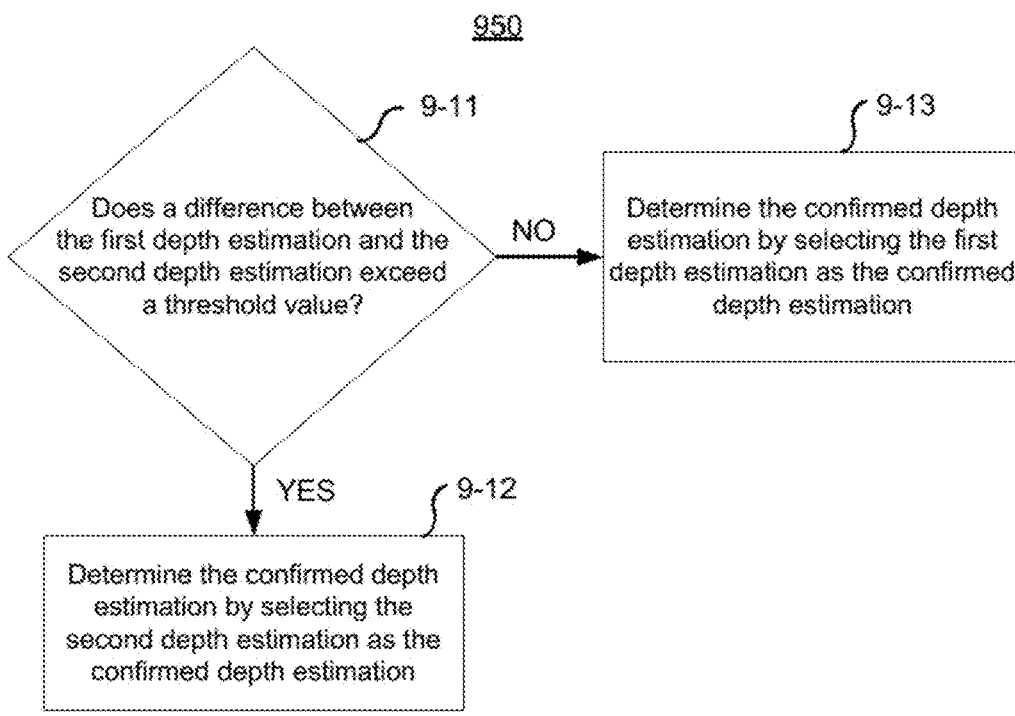
FIG. 9B is a flowchart representation of another method of determining a confirmed depth estimation in accordance with some implementations.

FIG. 9B is a flowchart representation of a method 950 of determining a confirmed depth estimation in accordance with some implementations. In various implementations, the method 950 is performed by a device (e.g., the controller 210 in FIGS. 2-3, the HMD 220 in FIGS. 2 and 4, or a combination thereof; or the robotic device controller 510 in FIGS. 5-6, the robotic device 520 in FIGS. 5 and 7, or a combination thereof). In some implementations, the method 950 is performed by processing logic, including hardware, firmware, software, or a combination thereof. In some implementations, the method 950 is performed by a processor executing code stored in a non-transitory computer-readable medium (e.g., a memory).

As represented by block 9-11, the method 950 includes determining whether or not a difference between a first depth estimation and a second depth estimation exceeds a threshold value (e.g., an absolute value, deterministic value, soft value, or the like).

If the difference between the first depth estimation and the second depth estimation exceeds the threshold value (the "YES" path from block 9-11), the method 950 includes, as represented by block 9-12, determining the confirmed depth estimation by selecting the second depth estimation as the confirmed depth estimation.

If the difference between the first depth estimation and the second depth estimation does not exceed the threshold value (the "NO" path from block 9-11), the method 950 includes, as represented by block 9-13, determining the confirmed depth estimation by selecting the first depth estimation as the confirmed depth estimation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors and non-transitory memory:
obtaining image data including one or more images of a real-world environment;
obtaining a first depth estimation characterizing a distance between the device and the real-world environment in a direction relative to the device, wherein the first depth estimation is derived from the image data;
obtaining acoustic data representing audio in the real-world environment;
obtaining a second depth estimation characterizing the distance between the device and the real-world environment in the direction relative to the device, wherein the second depth estimation is derived from the acoustic data, wherein the first depth estimation characterizes a distance between the device and a first surface in the real-world environment and the second depth estimation characterizes a distance between the device and a second surface in the real-world environment different than the first surface; and
in response to determining that a difference between the first depth estimation and the second depth estimation exceeds a threshold value, determining a confirmed depth estimation characterizing the distance between the device and the real-world environment in the direction relative to the device as the second depth estimation.

2. The method of claim 1, further comprising:
in response to determining that the difference between the first depth estimation and the second depth estimation is less than the threshold value, determining the confirmed depth estimation as the first depth estimation.

3. The method of claim 1, further comprising generating an acoustic wave using an audio transceiver, wherein the acoustic data includes a reflection of the acoustic wave.

4. The method of claim 1, wherein the device corresponds to a head-mounted display.

5. The method of claim 1, wherein the device corresponds to a robotic agent.

6. The method of claim 1, wherein the second surface is a transparent surface or a mirrored surface.

7. The method of claim 1, wherein the acoustic data represents audible audio in the real-world environment.

8. The method of claim 7, wherein the audible audio is generated by an audio generating source in the real-world environment separate from the device.

9. The method of claim 7, wherein the audible audio includes speech from a person in the real-world environment.

10. The method of claim 1, wherein obtaining the first depth estimation includes:
determining, in each image of at least some of the one or more images in the image data, an anchor point indicating a location of the first surface in the respective image; and
computing the first depth estimation to minimize disparity between each anchor point in each image.

11. A device comprising:
non-transitory memory; and
one or more processors to:
obtain image data including one or more images of a real-world environment;
obtain a first depth estimation characterizing a distance between the device and the real-world environment in a direction relative to the device, wherein the first depth estimation is derived from the image data;
obtain acoustic data representing audio in the real-world environment;
obtain a second depth estimation characterizing the distance between the device and the real-world environment in the direction relative to the device, wherein the second depth estimation is derived from the acoustic data, wherein the first depth estimation characterizes a distance between the device and a first surface in the real-world environment and the second depth estimation characterizes a distance between the device and a second surface in the real-world environment different than the first surface; and
in response to determining that a difference between the first depth estimation and the second depth estimation exceeds a threshold value, determine a confirmed depth estimation characterizing the distance between the device and the real-world environment in the direction relative to the device as the second depth estimation.

12. The device of claim 11, wherein the one or more processors are further to:
in response to determining that the difference between the first depth estimation and the second depth estimation is less than the threshold value, determine the confirmed depth estimation as the first depth estimation.

13. The device of claim 11, wherein the one or more processors are further to generate an acoustic wave using an audio transceiver, wherein the acoustic data includes a reflection of the acoustic wave.

14. The device of claim 11, wherein the second surface is a transparent surface or a mirrored surface.

15. The device of claim 11, wherein the acoustic data represents audible audio in the real-world environment.

16. The device of claim 15, wherein the audible audio is generated by an audio generating source in the real-world environment separate from the device.

17. The device of claim 15, wherein the audible audio includes speech from a person in the real-world environment.

18. The device of claim 11, wherein the one or more processors are to obtain the first depth estimation by:
determining, in each image of at least some of the one or more images in the image data, an anchor point indicating a location of the first surface in the respective image; and
computing the first depth estimation to minimize disparity between each anchor point in each image.

19. A non-transitory memory storing one or more programs which, when executed by one or more processors of a device, cause the device to:
obtain image data including one or more images of a real-world environment;
obtain a first depth estimation characterizing a distance between the device and the real-world environment in a direction relative to the device, wherein the first depth estimation is derived from the image data;
obtain acoustic data representing audio in the real-world environment;

obtain a second depth estimation characterizing the distance between the device and the real-world environment in the direction relative to the device, wherein the second depth estimation is derived from the acoustic data, wherein the first depth estimation characterizes a distance between the device and a first surface in the real-world environment and the second depth estimation characterizes a distance between the device and a second surface in the real-world environment different than the first surface; and in response to determining that a difference between the first depth estimation and the second depth estimation exceeds a threshold value, determine a confirmed depth estimation characterizing the distance between the device and the real-world environment in the direction relative to the device as the second depth estimation.

20. The non-transitory memory of claim 19, wherein the one or more programs, when executed by the one or more processors of the device, further cause the device to:

in response to determining that the difference between the first depth estimation and the second depth estimation is less than the threshold value, determine the confirmed depth estimation as the first depth estimation.

21. The non-transitory memory of claim 19, wherein the acoustic data represents audible audio in the real-world environment.

22. The non-transitory memory of claim 21, wherein the audible audio is generated by an audio generating source in the real-world environment separate from the device.

23. The non-transitory memory of claim 21, wherein the audible audio includes speech from a person in the real-world environment.

24. The non-transitory memory of claim 19, wherein obtaining the first depth estimation includes:

determining, in each image of at least some of the one or more images in the image data, an anchor point indicating a location of the first surface in the respective image; and computing the first depth estimation to reduce disparity between each anchor point in each image.

25. The non-transitory memory of claim 19, wherein the second surface is a transparent surface or a mirrored surface.

* * * * *